United States Patent [19]
Morel

[11] Patent Number: 4,484,377
[45] Date of Patent: Nov. 27, 1984

[54] SHREDDING MACHINE FOR RECYCLING TEXTILE FIBERS AND METHOD

[75] Inventor: André Morel, La Croix du Mont, France

[73] Assignee: Constructions Mecaniques F. LaRoche & Fils, France

[21] Appl. No.: 342,989

[22] Filed: Jan. 27, 1982

[30] Foreign Application Priority Data

Jan. 27, 1981 [FR] France .............................. 81 02058

[51] Int. Cl.³ ............................................ D01G 11/00
[52] U.S. Cl. ...................................................... 19/82
[58] Field of Search ............................ 19/82, 107, 200

[56] References Cited

U.S. PATENT DOCUMENTS

| | | | |
|---|---|---|---|
| 2,901,777 | 9/1959 | Sofio | 19/82 |
| 3,098,264 | 7/1963 | Meinicke | 19/82 |
| 4,300,267 | 11/1981 | Winch et al. | 19/107 X |
| 4,301,573 | 11/1981 | Gunter et al. | 19/200 |

Primary Examiner—Louis Rimrodt
Attorney, Agent, or Firm—Remy J. VanOphem

[57] ABSTRACT

An improved waste shredding machine and method wherein insufficiently shredded waste is returned to the shredding machine.

10 Claims, 2 Drawing Figures

SHREDDING MACHINE FOR RECYCLING TEXTILE FIBERS AND METHOD

BACKGROUND OF THE PRESENT INVENTION

The present invention relates to a shredding machine of the type used in the textile industry for shredding various textile wastes so as to obtain fibers which are reusable in different systems for making threads, insulation padding, stuffing materials, etc.

The machines existing at the present time are known under the name of "shredding machine" or "waste opening machine". Each known machine has one or more drums with points. Each of these drums with points rotates in front of a wad of textile wastes which is fed to it and which it shreds in pieces. The materials thus defibered by a drum are presented to the following drum which shreds them in pieces again, and does this again until a complete and perfect fiber removal is obtained. Feed systems operating on various different principles are used to present the fibers or the wastes to each of the successive drums with points.

To improve still further the quality of the fiber removal, the known shredding machines are generally equipped with recycling devices for insufficiently defibered materials. The latter are recovered at the outlet of one or another of the drums and reintroduced automatically into the feed of the machine.

These shredding machines of the known type with recycling make it possible to achieve a final defibering of remarkable quality. However the recycling system used in the known machines have a relatively expensive and complicated construction. Two types of construction are known for this recycling system. Namely, according to a first embodiment known from French Pat. Nos. 1,432,694 and 1,467,276, the materials considered to be insufficiently defibered by a drum with points are selected and collected under this drum by a controllable device, then sent along by conveyor belts which recycle them into the feed mechanism for again passing them into the machine.

According to a second known embodiment, the drum with points rotates "upward" and the insufficiently defibered materials are selected and collected at its upper part, then drawn off by air in a pneumatic duct which transfers them to a cyclone separator from which they are sent to the feed of the machine.

It is found that in both of these two known systems, one is led to use expensive and complicated means for the recycling, which are,
either mechanical means such as conveyor belts;
or pneumatic means especially provided for this purpose, as for example air ducts and cyclone separators.

The present invention's primary objective is to simplify these recycling devices by carrying out the recycling of defibered materials on the basis of the strong suction power of a perforated drum which is found in each shredding machine or opening machine for waste.

BRIEF DESCRIPTION OF THE DRAWINGS

The attached drawings, given as a nonlimiting example, make it possible to understand better the characteristics and advantages of the invention.

DETAILED DESCRIPTION OF THE PREFERRED EMBODIMENT

Figure 1:
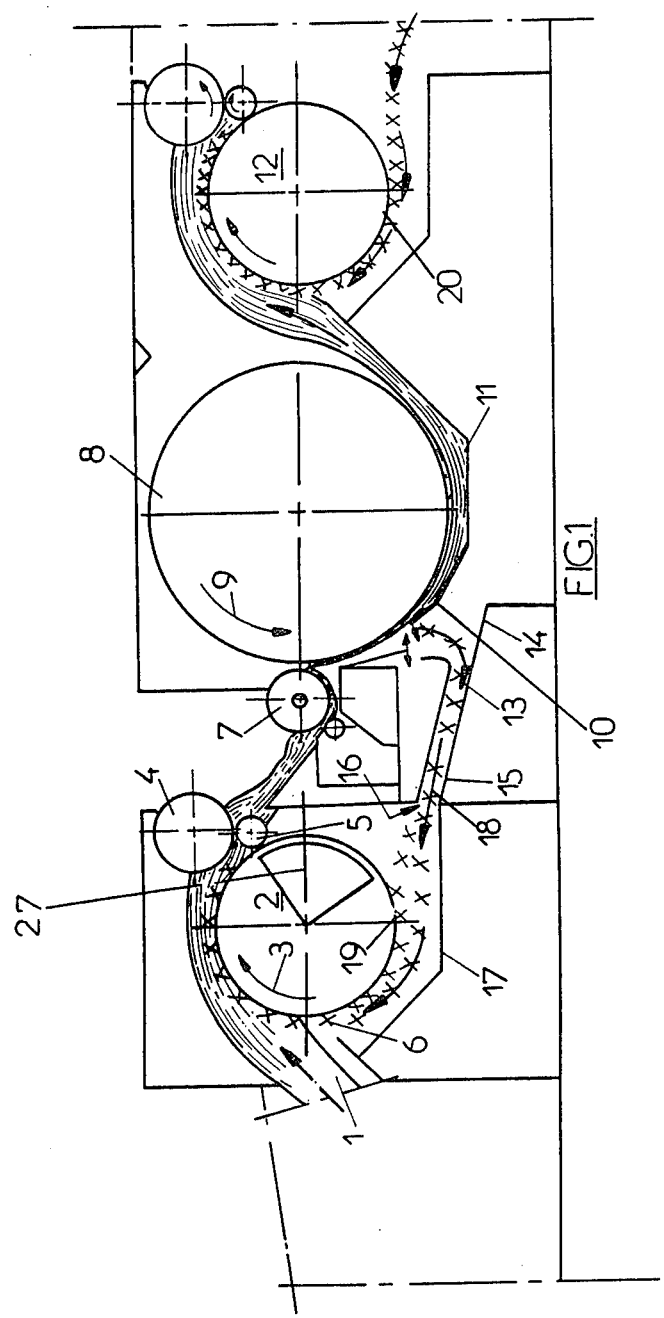
FIG. 1 is a diagrammatic view illustrating the device according to the invention, as it is used on a shredding cylinder rotating "downward"

In FIG. 1 is shown a shredding machine in which the materials 1 to be defibered are introduced to a perforated drum 2 which rotates in the direction indicated by the arrow 3. The interior of the drum 2 is put under a strongly reduced pressure or vacuum by a ventilating fan of a known type, not shown, in such a manner as to convey toward two extractor rollers 4 and 5 a wad of material 1 formed both by the materials to be shredded and by recycled materials 6 mixed therewith. A cover 27 is placed so as to be orientable toward the interior of the drum 2. It centralizes an angle zone and favors the suction of the waste. The composite wad of materials 1, 6 passes between the two rotating rollers 4 and 5 from which it is sent towards a feed system 7. The latter presents the wad of material in front of the teeth of a rotating shredding cylinder or drum with points 8. In the case illustrated in FIG. 1, the cylinder 8 rotates as indicated by the arrow 9.

Due to centrifugal force, the drum with points 8 throws the defibered materials out toward a separating device 10 of a known type which, by means of a predetermined judicious regulation, makes a selection between,
the materials in the passage 11 which are sufficiently defibered and which are conveyed toward the perforated drum 12 with reduced pressure of the following stage; and
the materials 13, insufficiently defibered, which are to be recycled.

The invention more particularly relates to simple and effective means used for recycling the materials 13, that is, to send them toward the materials 1 at the inlet of the machine and mix them there.

The device according to the invention consists of a receptacle 14 onto which opens one end of a suction duct 15. The other end 16 of this duct opens into the inside of casing 17 which is arranged around the lower part of the perforated drum 2. For this reason the strongly reduced or vacuum prevailing inside the drum 2 is also exerted in the interior of the casing 17 as well as in the duct 15. Its operation is as follows:

The materials 13, which are insufficiently shredded after selection by the separating device 10, fall onto the receptacle 14 and are sucked into the duct 15 where they move along in the direction of the arrow 18. The receptacle 14 may be used to eliminate, by the effect of centrifugal force, certain heavy materials (pieces of wood, metal), which are encountered in waste and which might damage the points of the working drums. Thus these materials 13 reach the inside of the casing 17 and they stick at 19 onto the lower face of the rotating perforated drum 2. They remain stuck on the periphery of this drum, and when they reach the inlet they become automatically mixed with the new materials 1. As pointed out above, the composite wad formed by the whole of the materials 1 and 6 is conveyed by the feed system 7 toward the drum with points 8 which defibers these materials.

As for the materials whose defibering is determined to be satisfactory, they are sent along the drum to a passage 11, then along this passage to the perforated suction drum 12 of the following stage where they meet other materials 20 preselected to be insufficiently open in a second stage and recycled.

Figure 2:
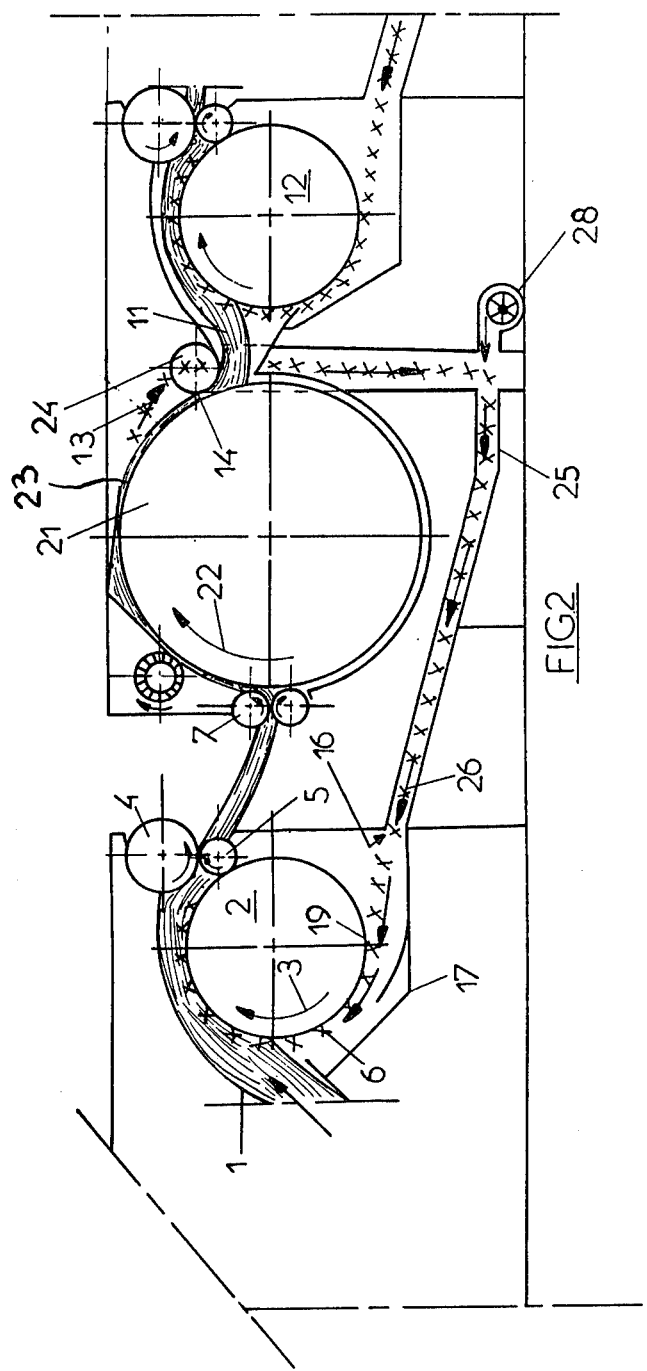
FIG. 2 is a similar view for the modification according to the invention corresponding to a shredding cylinder rotating "upward".

The modification illustrated in FIG. 2 relates to a shredding machine of a similar type with the difference that a drum with points 21 rotates "upward", that is, in the direction of the arrow 22. The other elements corresponding to those of FIG. 1 have been designated by the same reference numbers.

The materials presented by the feed system 7 are opened by the points of the drum 21 which carry them along its upper path, after which a controllable selective device 23 separates them into suitably opened materials in the passage 11, which are sent toward the drum with reduced pressure or vacuum 12 of the following stage; and materials 13 which are determined to be insufficiently opened, which are gathered on a receptacle 14 placed above the downstream face of the drum 21.

The bottom of the receptacle 14 empties into the opening 24 of a duct 25, the other end of which opens at 16 into the casing 17 surrounding the drum with reduced pressure or vacuum 2, as indicated previously. A small relay ventilator fan 28 creates a pressure force which facilitates the transfer of the materials between the receptacle 24 and the perforated drum 2.

The operation of this modification is similar to that of FIG. 1, that is, the insufficiently opened materials 13 are by the drawn vacuum of the drum 2, through the opening 16, the duct 25 and the inlet or opening 24. It is this reduced pressure in the drum 2, and this alone, which causes the materials 13 to travel as indicated by the arrow 26 until they come to stick at 19 onto the outer wall of the drum 2 which recycles them.

Another advantage of the invention results from the fact that in both of the two embodiments described above the recycling is done inside one and the same stage of the machine, that is for example beyond the downstream part of the drum with points 21 and up to its drum 2. Consequently, if the shredding machine has a number of successive stages, each stage can be equipped with its own recycling system. This represents a considerable advantage in relation to the previously known systems where the materials of each stage can only be recycled toward a single zone, that is the inlet feed for the whole machine.

I claim:

1. In a waste shredding machine having at least one shredding drum with teeth for shredding said waste, the improvement comprising said shredding machine further having:

at least one perforated drum disposed upstream of said at least one shredding drum;

a vacuum means for establishing a strongly reduced pressure within said at least one perforated drum;

a first transporting means delivering said waste to be shredded to said at least one perforated drum;

a second transporting means delivering said waste to be shredded from said at least one perforated drum to said at least one shredding drum;

a separating means disposed downstream of said at least one shredding drum, separating said waste into sufficiently shredded waste and insufficiently shredded waste; and a duct interposed between said separating means and said at least one perforated drum such that said vacuum means draws said insufficiently shredded waste from said at least one separating means to said perforated drum.

2. The waste shredding machine of claim 1 wherein said separating means comprises a receptacle disposed adjacent to said at least one shredding drum downstream of said second transporting means such that, said insufficiently shredded waste descends into said receptacle due to its greater weight than said sufficiently shredded waste.

3. The waste shredding machine of claim 2 wherein said at least one shredding drum rotates upwardly and wherein said receptacle is disposed on the opposite side of said at least one shredding drum from said second transporting means.

4. The waste shredding machine of claim 1 wherein said at least one shredding drum rotates downwardly and wherein said receptacle is disposed below said second transporting means.

5. The waste shredding machine of claim 1 wherein said shredding machine comprises at least two of said shredding drums and further, wherein one of said at least one perforated drums, said first and second transporting means, said separating means, and said duct are provided for each of said shredding drums.

6. The waste shredding machine of claim 1 wherein a movable cover is interconnected with said at least one perforated drum such that, said cover assists in directing said waste around said at least one perforated drum.

7. The waste shredding machine of claim 1 further comprising a fan operably disposed between said separating means and said duct, said fan assisting said vacuum means in transporting waste along said duct.

8. A method of shredding waste comprising the steps of:

transporting waste to be shredded to a perforated drum having internal vacuum means;

transporting said waste from said perforated drum to a rotating shredding drum;

shredding said waste between the teeth of said shredding drum and an enclosure for said shredding drum;

separating said shredded waste into sufficiently shredded waste and insufficiently shredded waste; and returning said insufficiently shredded waste to said perforated drum along a duct operably disposed between a downstream portion of said shredding drum and an upstream portion of said perforated drum, said insufficiently shredded waste being drawn along said duct by said vacuum means.

9. The method of claim 8 wherein said sufficiently shredded waste is separated from said insufficiently shredded waste by means of a receptacle disposed at a downstream location of said shredding drum, such that, said insufficiently shredded waste descends due to gravity into said receptacle.

10. The method of claim 8 wherein said insufficiently shredded waste is moved along said duct by said vacuum means and by a fan.

* * * * *

UNITED STATES PATENT AND TRADEMARK OFFICE
CERTIFICATE OF CORRECTION

PATENT NO. : 4,484,377
DATED : November 27, 1984
INVENTOR(S) : Andre Morel

Page 1 of 2

It is certified that error appears in the above-identified patent and that said Letters Patent is hereby corrected as shown below:

Column 2, line 45, after "strongly reduced" insert ---- pressure ----.

Column 3, line 1, delete "open" and insert ---- shredded ----.

Column 3, line 10, delete "opened" and insert ---- shredded ----.

Column 3, line 13, delete "opened" and insert ---- shredded ----.

Column 3, line 17, delete "opened" and insert ---- shredded ----.

Column 3, line 25, delete "receptacle 24" and insert ---- receptacle 14 ----.

Column 3, line 27, delete "opened" and insert ---- defibered ----.

UNITED STATES PATENT AND TRADEMARK OFFICE
CERTIFICATE OF CORRECTION

PATENT NO. : 4,484,377
DATED : November 27, 1984
INVENTOR(S) : Andre Morel

It is certified that error appears in the above-identified patent and that said Letters Patent is hereby corrected as shown below:

Column 3, line 28, delete "by the drawn" and insert ---- drawn by the ----.

Column 3, line 37, delete "that is for example" and insert ---- that is, for example, ----.

Signed and Sealed this

Second Day of July 1985

[SEAL]

*Attest:*

DONALD J. QUIGG

*Attesting Officer*   *Acting Commissioner of Patents and Trademarks*